United States Patent
Chaudhary et al.

(10) Patent No.: US 10,119,015 B2
(45) Date of Patent: Nov. 6, 2018

(54) MOISTURE-CURABLE POLYMERIC COMPOSITIONS HAVING HALOGENATED POLYMERS AND METAL MERCAPTIDES

(71) Applicants: Dow Global Technologies LLC, Midland, MI (US); Rohm and Haas Company, Philadelphia, PA (US)

(72) Inventors: Bharat I. Chaudhary, Princeton, NJ (US); Amy L. Waxman, Wynnewood, PA (US); Aleksander Gorshenin, Philadelphia, PA (US)

(73) Assignees: Dow Global Technologies LLC, Midland, MI (US); Rohm and Haas Company

( * ) Notice: Subject to any disclaimer, the term of this patent is extended or adjusted under 35 U.S.C. 154(b) by 80 days.

(21) Appl. No.: 15/315,620

(22) PCT Filed: May 20, 2015

(86) PCT No.: PCT/US2015/031672
§ 371 (c)(1),
(2) Date: Dec. 6, 2016

(87) PCT Pub. No.: WO2015/195267
PCT Pub. Date: Dec. 23, 2015

(65) Prior Publication Data
US 2017/0121514 A1    May 4, 2017

Related U.S. Application Data

(60) Provisional application No. 62/013,564, filed on Jun. 18, 2014.

(51) Int. Cl.
*C08L 23/08* (2006.01)
*C08L 51/06* (2006.01)
*C08L 27/06* (2006.01)

(52) U.S. Cl.
CPC ........... *C08L 23/0892* (2013.01); *C08L 27/06* (2013.01); *C08L 51/06* (2013.01); *C08L 2201/02* (2013.01); *C08L 2205/025* (2013.01); *C08L 2205/03* (2013.01); *C08L 2205/035* (2013.01)

(58) Field of Classification Search
CPC ....... C08L 23/0892; C08L 51/06; C08L 27/06
See application file for complete search history.

(56) References Cited

U.S. PATENT DOCUMENTS

2006/0255501 A1  11/2006  Jackson et al.
2012/0128906 A1  5/2012  Jackson et al.

FOREIGN PATENT DOCUMENTS

CN    103992600 A    8/2014

OTHER PUBLICATIONS

Moore, E.ed Polypropylene Handbook: 25 Polymerization, Characterization, Properties, Processing, Applications, 1996 pp. 3-14, 113-176.
Sun, B. et al, Thermal Stability of epoxidized soybean oil an dits absorption and migration in poly(vinylchloride) Polymer Engineering and Science, 53, 2013, pp. 1645-1656.
PCT/US2015/031672, International Search Report & Written Opinion dated Jul. 14, 2015.
PCT/US2015/031672, International Preliminary Report on Patentability dated Dec. 20, 2016.

*Primary Examiner* — John E Uselding

(57) ABSTRACT

A moisture-curable polymeric composition comprising a polyolefin having hydrolyzable silane groups, a halogenated polymer, and a metal mercaptide. Such moisture-curable polymeric compositions, and crosslinked compositions prepared therefrom, can be used in the production of various articles of manufacture, such as coated conductors.

10 Claims, No Drawings

MOISTURE-CURABLE POLYMERIC COMPOSITIONS HAVING HALOGENATED POLYMERS AND METAL MERCAPTIDES

REFERENCE TO RELATED APPLICATIONS

The present application claims the benefit of U.S. Provisional Application No. 62/013,564, filed on Jun. 18, 2014.

FIELD

Various embodiments of the present invention relate to moisture-curable polymeric compositions comprising a polyolefin having hydrolyzable silane groups, a halogenated polymer and a metal mercaptide.

INTRODUCTION

Halogen-containing additives, such as chlorine- and bromine-containing additives, are often employed to impart flame retardancy to polyolefins. Antimony oxide can increase the flame-retardant action of halogens, and is often used as a synergist. Another approach to impart flame retardancy to polyolefins has been to make thermoplastic blends of halogen-containing polymers with polyolefins. However, making such blends crosslinkable (i.e., thermosetting) can be difficult, since not all types of halogenated polymers can be effectively crosslinked by free-radical chemistries (e.g., peroxide or radiation crosslinking). Similarly, grafting functional groups to the halogenated polymers to enable crosslinking presents difficulties, since such grafting techniques often require free-radical techniques. Accordingly, improvements in flame-retardant crosslinkable polymeric compositions are desired.

SUMMARY

One embodiment is a moisture-curable polymeric composition, comprising:
(a) a polyolefin having hydrolyzable silane groups;
(b) a halogenated polymer; and
(c) a metal mercaptide.

DETAILED DESCRIPTION

Various embodiments of the present invention concern moisture-curable polymeric compositions comprising a polyolefin having hydrolyzable silane groups, a halogenated polymer, and a metal mercaptide. Additional embodiments concern methods for making such moisture-curable polymeric compositions. Further embodiments concern crosslinked polymeric compositions made from such moisture-curable polymeric compositions, methods for making such crosslinked polymeric compositions, and articles of manufacture comprising such crosslinked polymeric compositions.

Polyolefin

As just noted, the moisture-curable polymeric compositions described herein comprise a polyolefin having hydrolyzable silane groups. As used herein, a "moisture-curable" polymeric composition is a composition containing at least one component having hydrolyzable silane groups that, when in the presence of water, will undergo a hydrolysis reaction to generate Si—O—Si bonds to form a crosslinking network between polymer chains. In the instant disclosure, the polyolefin having hydrolyzable silane groups include silane-functionalized olefinic polymers such as silane-functionalized polyethylene, polypropylene, etc., and various blends of these polymers. In one or more embodiments, the silane-functionalized olefinic polymers can be selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, the interpolymer having a hydrolyzable silane grafted to its backbone. Exemplary α-olefins include propylene, 1-butene, 1-hexene, 4-methyl-1-pentene and 1-octene. Exemplary unsaturated esters are vinyl acetate or an acrylic or methacrylic ester.

Polyethylene, as used herein, is a homopolymer of ethylene or an interpolymer of ethylene and a minor amount (i.e., less than 50 mole percent ("mol %")) of one or more α-olefins and/or unsaturated esters having from 3 to 20 carbon atoms, or from 4 to 12 carbon atoms, and, optionally, a diene. Polyethylenes can also be a mixture or blend of such homopolymers and interpolymers. When a mixture is used, the mixture can be either an in situ blend or a post-reactor (e.g., mechanical) blend.

The polyethylene can be homogeneous or heterogeneous. Homogeneous polyethylenes typically have a polydispersity (Mw/Mn) of about 1.5 to about 3.5, an essentially uniform comonomer distribution, and a single, relatively low melting point as measured by differential scanning calorimetry. The heterogeneous polyethylenes typically have a polydispersity greater than 3.5 and lack a uniform comonomer distribution. Mw is weight-average molecular weight, and Mn is number-average molecular weight.

Polyolefins (e.g., polyethylenes) suitable for use herein can have a density in the range of from 0.850 to 0.970 g/cm$^3$, or from 0.870 to 0.930 g/cm$^3$. Polymer densities provided herein are determined according to ASTM International ("ASTM") method D792. In various embodiments, the polyolefins (e.g., polyethylenes) can have a melt index ($I_2$) in the range of from 0.01 to 2000, from 0.05 to 1000, or from 0.10 to 50 g/10 min. Melt indices provided herein are determined according to ASTM method D1238. Unless otherwise noted, melt indices are determined at 190° C. and 2.16 Kg (a.k.a., $I_2$). If polyethylene homopolymer is employed, then its $I_2$ can be from 0.1 to 10 g/10 min.

Polyethylenes used in the practice of this invention can be prepared by any known or hereafter discovered process (such as high-pressure, solution, slurry, or gas-phase) using any conventional or hereafter discovered conditions and techniques. Catalyst systems include Ziegler-Natta, Phillips, and the various single-site catalysts (e.g., metallocene, constrained geometry, etc.). The catalysts can be used with or without supports.

Useful polyethylenes include low density homopolymers of ethylene made by high-pressure processes (HP-LDPEs), linear-low-density polyethylenes (LLDPEs), very-low-density polyethylenes (VLDPEs), ultra-low-density polyethylenes (ULDPEs), medium-density polyethylenes (MDPEs), high-density polyethylene (HDPE), and metallocene and constrained-geometry copolymers.

High-pressure processes are typically free-radical-initiated polymerizations and conducted in a tubular reactor or a stirred autoclave. In a tubular reactor, the pressure can be in the range of from 25,000 to 45,000 psi, and the temperature can be in the range of from 200 to 350° C. In a stirred autoclave, the pressure can be in the range of from 10,000 to 30,000 psi, and the temperature can be in the range of from 175 to 250° C.

Interpolymers comprised of ethylene and unsaturated esters are well known and can be prepared by conventional high-pressure techniques. In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. The portion of the interpolymer attributed to the ester comonomer can be in the range of from 5 to less than 50 weight percent ("wt %") based on the weight of the interpolymer, or in the range of 15 to 40 wt %.

Examples of acrylates and methacrylates include, but are not limited to, ethyl acrylate, methyl acrylate, methyl methacrylate, t-butyl acrylate, n-butyl acrylate, n-butyl methacrylate, and 2-ethylhexyl acrylate. Examples of vinyl carboxylates include, but are not limited to, vinyl acetate, vinyl propionate, and vinyl butanoate. The melt index of ethylene/unsaturated ester interpolymers can be in the range of from 0.5 to 50 g/10 min, or in the range of from 2 to 25 g/10 min.

VLDPEs and ULDPEs are typically copolymers of ethylene and one or more α-olefins having 3 to 12 carbon atoms, or 3 to 8 carbon atoms. The density of the VLDPE or ULDPE can be in the range of from 0.870 to 0.915 g/cm$^3$. The melt index of the VLDPE or ULDPE can be in the range of from 0.1 to 20 g/10 min, or from 0.3 to 5 g/10 min. The portion of the VLDPE or ULDPE attributed to the comonomer(s), other than ethylene, can be in the range of from 1 to 49 wt % based on the weight of the copolymer, or from 15 to 40 wt %.

A third comonomer can be included, e.g., another α-olefin or a diene such as ethylidene norbornene, butadiene, 1,4-hexadiene or a dicyclopentadiene. Ethylene/propylene copolymers are generally referred to as EPRs, and ethylene/propylene/diene terpolymers are generally referred to as EPDMs. The third comonomer can be present in an amount of from 1 to 15 wt % based on the weight of the interpolymer, or from 1 to 10 wt %. In various embodiments, the interpolymer can contain two or three monomer types, inclusive of ethylene.

The LLDPE can include VLDPE, ULDPE, and MDPE, which are also linear, but, generally, have a density in the range of from 0.916 to 0.925 g/cm$^3$. The LLDPE can be a copolymer of ethylene and one or more α-olefins having from 3 to 12 carbon atoms, or from 3 to 8 carbon atoms. The melt index can be in the range of from 1 to 20 g/10 min., or from 3 to 8 g/10 min.

Any polypropylene may be used in these compositions. Examples include homopolymers of propylene, copolymers of propylene and other olefins, and terpolymers of propylene, ethylene, and dienes (e.g. norbornadiene and decadiene). Additionally, the polypropylenes may be dispersed or blended with other polymers, such as EPR or EPDM. Suitable polypropylenes include thermoplastic elastomers (TPEs), thermoplastic olefins (TPOs) and thermoplastic vulcanates (TPVs). Examples of polypropylenes are described in *Polypropylene Handbook: Polymerization, Characterization, Properties, Processing, Applications*, 3-14, 113-176 (E. Moore, Jr. ed., 1996).

Hydrolyzable silane monomers suitable for use in forming the silane-functionalized polyolefin can be any hydrolyzable silane monomer that will effectively copolymerize with an olefin (e.g., ethylene), or graft to and crosslink an olefin (e.g., ethylene) polymer. Those described by the following formula are exemplary:

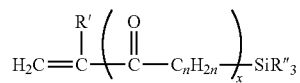

in which R' is a hydrogen atom or methyl group; x is 0 or 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), an aryloxy group (e.g. phenoxy), an araloxy group (e.g. benzyloxy), an aliphatic acyloxy group having from 1 to 12 carbon atoms (e.g. formyloxy, acetyloxy, propanoyloxy), an amino or substituted amino group (alkylamino, arylamino), or a lower-alkyl group having 1 to 6 carbon atoms inclusive, with the proviso that not more than one of the three R" groups is an alkyl. Such silanes may be copolymerized with ethylene in a reactor, such as a high-pressure process. Such silanes may also be grafted to a suitable ethylene polymer by the use of a suitable quantity of organic peroxide. Suitable silanes include unsaturated silanes that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Suitable hydrolyzable silane monomers include, but are not limited to, vinyltrimethoxysilane ("VTMS"), vinyltriethoxysilane ("VTES"), vinyltriacetoxysilane, and gamma-(meth)acryloxy propyl trimethoxy silane.

Incorporation of the hydrolyzable silane group in the polyolefin can be accomplished using any known or hereafter discovered copolymerization or grafting techniques. By way of example, the hydrolyzable silane monomer can be grafted onto a polyolefin by combining a polyolefin with an unsaturated alkoxysilane (e.g., vinyltrimethoxysilane) and a peroxide (e.g., dicumyl peroxide ("DCP")). After mixing for a period of time (e.g., 1-30 minutes), the mixture can be extruded at elevated and increasing temperatures (e.g., from 160° C. to 220° C.). Whether copolymerizing or grafting, the amount of unsaturated hydrolyzable silane monomer employed in the reaction can range from 0.5 to 10 wt %, from 1 to 5 wt %, or from 1 to 3 wt % based on the combined weight of the polyolefin and the unsaturated hydrolyzable silane monomer. In an embodiment, the hydrolyzable silane group can be melt-blended with the polyolefin, peroxide and other ingredients in one step as part of the cable extrusion process, without a need to first prepare a compound or grafted polyolefin prior to use during cable extrusion.

An example of a commercially available polyolefin having hydrolyzable silane groups is SI-LINK™ DFDA-6451, which is ethylene copolymerized with 1.5 wt % vinyltrimethoxysilane prepared using a high-pressure reactor, and is available from The Dow Chemical Co., Midland, Mich., USA.

The polyolefin can also comprise blends of silane-functionalized olefinic polymer with one or more other polyolefins that are not silane functionalized.

In various embodiments, the polyolefin having hydrolyzable silane groups can be present in the crosslinkable polymeric composition in an amount of at least 30 wt %, at least 50 wt %, at or least 70 wt % based on the combined weight of the polyolefin, the halogenated polymer, and the metal mercaptide. In some embodiments, the polyolefin having hydrolyzable silane groups can be present in an amount ranging from 35 to 95 wt %, from 35 to 90 wt %, or from 35 to 75 wt % based on the combined weight of the polyolefin, the halogenated polymer, and the metal mercaptide.

Halogenated Polymer

As noted above, the moisture-curable polymeric compositions described herein comprise a halogenated polymer. A "halogenated polymer" is any polymer having functionalized, grafted or copolymerized therein at least one type of monomer or polymer containing a halogen atom (i.e., fluorine, chlorine, bromine, iodine, and astatine). In various embodiments, the halogen of the halogenated polymer can be selected from chlorine, bromine, and mixtures thereof. In some embodiments, the halogen of the halogenated polymer is chlorine.

In various embodiments, the halogenated polymer can be a halogen-containing vinyl or vinylidene polymer or resin in which the halogen is attached directly to the carbon atoms. In some embodiments, the halogenated polymer can be a vinyl halide polymer, more particularly a vinyl chloride polymer. When a vinyl chloride polymer is employed, such polymer can be made from monomers consisting of vinyl chloride alone or a mixture of vinyl chloride and other monomers where vinyl chloride constitutes at least about 70 wt % based on the total monomer weight of the polyvinyl chloride ("PVC") or chlorinated polyvinyl chloride ("CPVC").

In one or more embodiments, the halogenated polymer can be selected from the group consisting of PVC; CPVC; chlorinated polyethylene; chlorinated natural and synthetic rubber; rubber hydrochloride; chlorinated polystyrene; brominated polystyrene; brominated natural and synthetic rubber; polyvinyl bromide; butadiene styrene brominated copolymer; other brominated polymers; polyvinyl fluoride; copolymers of vinyl chloride with one or more copolymerizable ethylenically unsaturated monomers selected from vinyl acetate, vinyl butyrate, vinyl benzoate, vinylidene chloride, an alkyl fumarate, an alkyl maleate, vinyl propionate, an alkyl acryalte, an alkyl methacrylate, methyl alpha-chloroacrylate, styrene, trichloroethylene, a vinyl ether, a vinyl ketone, 1-fluoro-2-chloroethylene, acrylonitrile, chloroacrylonitrile, allylidene diacetate, chloroallylidene diacetate, and mixtures of two or more thereof.

Commercially available grades of brominated polymers include Emerald Innovation™ 1000 (product of Chemtura Corporation) and Emerald Innovation™ 3000 (CAS number 1195978-93-8; product of Chemtura Corporation).

When a chlorinated polyethylene is used, such polymer can have from 14 to 75 wt % (e.g., 36 wt %) chlorine. The chlorinated polyethylene also includes chlorinated and anhydride-modified low-density polyethylene prepared by solid-phase chlorination and grafting (*RSC Adv.,* 2014, 4, 12490-12496). Commercially available grades of chlorinated polyethylene include TYRIN™ chlorinated polyethylene (a product of The Dow Chemical Company).

When copolymers of vinyl chloride and ethylenically unsaturated monomers are employed, such copolymers can have from 1 to 90 wt %, or from 1 to 30 wt %, of the ethylenically unsaturated monomers. As the ethylenically unsaturated monomers, a suitable example of an alkyl fumarate includes diethyl fumarate; a suitable example of an alkyl maleate includes diethyl maleate; suitable examples of alkyl acrylates include methyl acrylate, 2-ethylhexyl acrylate, and butyl acrylate; suitable examples of methacrylates include methyl methacrylate, ethyl methacrylate, and butyl methacrylate; suitable examples of vinyl ethers include vinyl ethyl ether, vinyl chloroethyl ether, and vinyl phenyl ether; and suitable examples of vinyl ketones include vinyl methyl ketone and vinyl phenyl ketone. Typical copolymers can include vinyl chloride-vinyl acetate (94:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), and vinyl chloride-2-ethylhexyl acrylate (80:20).

In various embodiments, the halogenated polymer can be selected from PVC, CPVC, and chlorinated polyethylene. In some embodiments, the halogenated polymer is PVC. In other embodiments, the halogenated polymer is CPVC.

The PVC may be made by any process known or hereafter discovered in the art, including suspension, emulsion, solution, and bulk or mass polymerization. The chlorinated polyethylene may be made by any process known or hereafter discovered in the art, including solid-state, melt-state or gas-phase chlorination.

In various embodiments, the halogenated polymer can be present in the moisture-curable polymeric composition in an amount of at least 5 wt %, at least 20 wt %, at or least 40 wt % based on the combined weight of the polyolefin, the halogenated polymer, and the metal mercaptide. In some embodiments, the halogenated polymer can be present in an amount ranging from 5 to 60 wt %, from 20 to 50 wt %, or from 30 to 40 wt % based on the combined weight of the polyolefin, the halogenated polymer, and the metal mercaptide.

Metal Mercaptide

As noted above, the moisture-curable polymeric compositions described herein comprise a metal mercaptide. As used herein, "metal mercaptide" means a metal salt of a mercaptan. Mercaptans have the general formula: R—SH, where R is an organic radical. Thus, a metal mercaptide has the general formula: $(R—S)_a[M]^b$, where "b" is equal to the oxidation state of metal M, and "a" is equal to b.

Metal mercaptide stabilizers for vinyl chloride polymers are known in the art. Examples of suitable metal mercaptides for use in the present disclosure include, but are not limited to, the tin-based mercaptide stabilizers taught in U.S. Pat. No. 4,576,984.

In one or more embodiments, the metal mercaptide can have the following formula:

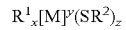

where each $R^1$ is independently selected from an alkyl group, an alkenyl group, an aryl group, an aralkyl group, an alkaryl group, a cycloalkyl group, and a cycloalkenyl group;

where each $R^2$ is independently selected from an alkyl group, an alkenyl group, an aryl group, an aralkyl group, an alkaryl group, a cycloalkyl group, a cycloalkenyl group, or a structure selected from the following formulas (1) through (6):

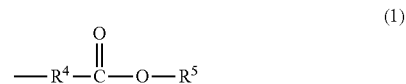

(1)

-continued

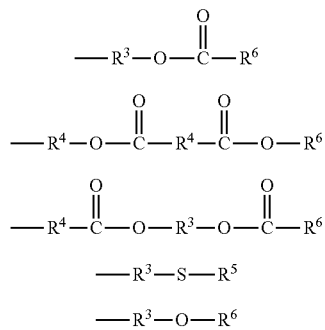

where $R^3$ is selected from an alkylene group having at least 2 carbon atoms, an arylene group, an alkenylene group, a cycloalkylene group, or a cycloalkenylene group, where $R^4$ is selected from an alkylene group, an arylene group, and alkenylene group, a cycloalkylene group, or a cycloalkenylene group, where $R^5$ is —H or $R^6$, where $R^6$ is selected from an alkyl group, an alkenyl group, an aryl group, an aralkyl group, an alkaryl group, a cycloalkyl group, and a cycloalkenyl group, where M is a metal selected from tin, antimony, zinc, and calcium, where y is equal to the oxidation state of metal M, where x can be any integer from 0 to y−1, inclusive, where z can be any integer from 1 to y, inclusive, where x+z=y.

In various embodiments, M is tin.

In various embodiments, $R^1$ can be an alkyl group having from 1 to 12 carbon atoms, or from 1 to 6 carbon atoms. Examples of alkyl groups suitable for use as $R^1$ include, but are not limited to, methyl, ethyl, propyl, and n-butyl. In various embodiments, $R^1$ is a methyl group. Furthermore, in embodiments where more than one $R^1$ group is present, all $R^1$ groups can be methyl groups.

In various embodiments, $R^2$ is formula (1).

In various embodiments, $R^4$ is an alkylene group having from 1 to 12 carbon atoms, or from 1 to 6 carbon atoms. Examples of alkylene groups suitable for use as $R^4$ include, but are not limited to, methylene, ethylene, and propylene. In various embodiments, $R^4$ is a methylene group. Furthermore, in embodiments where more than one $R^2$ radical is present, all $R^4$ groups present in each respective $R^2$ radical can be methylene groups.

In various embodiments, $R^5$ is an alkyl group having from 1 to 20 carbon atoms, or from 1 to 12 carbon atoms. In one or more embodiments, $R^5$ can be a branched alkyl group. Examples of alkyl groups suitable for use as $R^5$ include, but are not limited to, methyl, ethyl, propyl, isopropyl, n-butyl, isobutyl, tert-butyl, n-pentyl, isopentyl, n-hexyl, 2-ethylhexyl, and isooctyl. In various embodiments, $R^5$ is a 2-ethylhexyl group. Furthermore, in embodiments where more than one $R^2$ radical is present, all $R^5$ groups present in each respective $R^2$ radical can be 2-ethylhexyl groups.

In various embodiments, y can be 4, x can be from 1 to 2, and z can be from 2 to 3.

In one or more embodiments, the metal mercaptide can be selected from monomethyltin tris(2-ethylhexyl mercaptoacetate) and dimethyltin bis(2-ethylhexyl mercaptoacetate), represented by the following formulas (7) and (8), and mixtures thereof:

In various embodiments, the metal mercaptide can be a mixture of monomethyltin tris(2-ethylhexyl mercaptoacetate) and dimethyltin bis(2-ethylhexyl mercaptoacetate), which can be present in a weight ratio ranging from 9:1 to 1:9, or from 4:1 to 1:4. In an embodiment, the metal mercaptide can be a mixture of 80 wt % dimethyltin bis(2-ethylhexyl mercaptoacetate) and 20 wt % monomethyltin tris(2-ethylhexyl mercaptoacetate). In an embodiment, the metal mercaptide is a liquid at room temperature (e.g., 22° C.)

An example of a suitable commercially available metal mercaptide is ADVASTAB™ TM181-FS, available from PMC Organometallix, Inc., Mount Laurel, N.J., USA.

In various embodiments, the metal mercaptide can be present in the moisture-curable polymeric composition in an amount of at least 0.1 wt %, or at least 0.2 wt % based on the combined weight of the polyolefin, the halogenated polymer, and the metal mercaptide. In some embodiments, the metal mercaptide can be present in an amount ranging from 0.1 to 5 wt %, or from 0.2 to 3 wt % based on the combined weight of the polyolefin, the halogenated polymer, and the metal mercaptide.

Optional Silanol Condensation Catalyst

In various embodiments, the moisture-curable polymeric composition may optionally further comprise a silanol condensation catalyst. "Silanol condensation" catalysts are any compounds that act to initiate or increase the reaction rate of hydrolysis of the above-described hydrolyzable silane groups present on the polyolefin, and condensation of the resulting silanols, when the moisture-curable polymeric composition is treated in a humid environment.

In alternative embodiments, the moisture-curable polymeric composition contains no silanol condensation catalyst that is present in an amount sufficient to catalyze moisture crosslinking of the moisture-curable polymeric composition upon exposure to a humid environment (i.e., less than a catalytic amount). Though not wishing to be bound by theory, the inventors have surprisingly found that when a metal mercaptide and a halogenated polymer are employed with a polyolefin having hydrolyzable silane groups, moisture curing (crosslinking) of the polymeric composition appears to be sufficiently catalyzed when exposed to a humid environment even in the absence of any conventional silanol condensation catalyst. In various embodiments, the moisture-curable polymeric composition is substantially free of any silanol condensation catalysts. As used with respect to silanol condensation catalysts, the term "substantially free" means less than 100 ppm based on the total weight of the moisture-curable polymeric composition. In other embodiments, the moisture-curable polymeric composition can contain less than 10 ppm, less than 1 ppm, or be free of any silanol condensation catalysts.

Regardless, an additional conventional silanol condensation catalyst may optionally be included in the moisture-curable polymeric composition. The silanol condensation catalyst can be any known or hereafter discovered compound that acts as a moisture-cure catalyst, including Lewis and Bronsted acids or bases. Suitable Lewis acids include tin carboxylates, such as dibutyl tin dilaurate ("DBTDL"), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Examples of suitable Bronsted acid silanol condensation catalysts include, but are not limited to, monosulfonic acids and disulfonic acids. Sulfonic acids include the silanol condensation catalysts disclosed in U.S. Pat. No. 8,460,770 B2.

When employed, the silanol condensation catalyst can be present in an amount of at least 0.01 wt % or at least 0.02 wt %, based on the combined weight of the polyolefin, the halogenated polymer, the metal mercaptide, and the silanol condensation catalyst. In some embodiments, the silanol condensation catalyst can be present in an amount ranging from greater than 0 to 1.0 wt %, from 0.01 to 0.5 wt %, or from 0.02 to 0.2 wt %, based on the combined weight of the polyolefin, the halogenated polymer, the metal mercaptide, and the silanol condensation catalyst.

Additives

The moisture-curable polymeric compositions may also contain other components, such as antioxidants, colorants, corrosion inhibitors, lubricants, anti-blocking agents, flame retardants (if halogenated, then non-polymeric), compatibilizers, plasticizers, and processing aids. Suitable antioxidants include (a) phenolic antioxidants, (b) thio-based antioxidants, (c) phosphate-based antioxidants, and (d) hydrazine-based metal deactivators. Suitable phenolic antioxidants include methyl-substituted phenols. Other phenols, having substituents with primary or secondary carbonyls, are suitable antioxidants. One preferred phenolic antioxidant is isobutylidenebis(4,6-dimethylphenol). One preferred hydrazine-based metal deactivator is oxalyl bis(benzylidene hydrazide). These other components or additives are used in manners and amounts known in the art. For example, the antioxidant can typically be present in amount between about 0.05 and about 10 weight percent based on the total weight of the polymeric composition.

In various embodiments, the moisture-curable polymeric compositions can comprise one or more polymeric compatibilizers. Suitable polymeric compatibilizers include, but are not limited to, ethylene vinyl acetate ("EVA"), nitrile butadiene rubber ("NBR"), chlorinated polyolefin, and mixtures of two or more thereof. Polymeric compatibilizers, when employed, can be present in an amount ranging from 1 to 25 wt %, from 3 to 15 wt %, or from 4 to 10 wt %, based on the total weight of the moisture-curable polymeric composition.

In various embodiments, the moisture-curable polymeric compositions can comprise one or more flame-retardant additives, such as a non-polymeric halogenated flame retardant, that are either solid or liquid at 22° C. Such flame retardant additives include, but are not limited to, inorganic synergists (such as antimony trioxide), organohalogen compounds (including brominated flame retardants), organophosphorus compounds, inorganic phosphorus compounds, metal hydrates and mixtures of two or more thereof. When flame-retardant additives are employed, they can be present in a total (combined) amount ranging from 1 to 40 wt %, based on the entire weight of the moisture-curable polymeric composition.

Compounding and Fabrication

Compounding and melt blending of the moisture-curable polymeric composition can be effected by standard equipment known to those skilled in the art. Examples of compounding equipment are internal batch mixers, such as a BANBURY or BOLLING internal mixer. Alternatively, continuous single, or twin screw, mixers or extruders can be used, such as FARREL continuous mixer, a Werner and Pfleiderer twin screw mixer, or a Buss™ kneading continuous extruder. The crosslinkable polymeric composition can subsequently be fabricated, shaped, or molded into an end-use article by processes such as compression molding, injection molding, and extrusion through a die.

The components of the composition can be blended in any manner and using any equipment. Typically, the composition is melted blended using conventional mixing equipment, e.g., a BRABENDER batch mixer or extruder. The mixing or blending may be done at, below, or above the upper melting temperature (point) of the polyolefin, halogenated polymer, or metal mercaptide. The components (ingredients and any additives) can be added in any manner, including soaking and mixing, and in any order. In one embodiment, the ingredients and any additives are blended with one another to first make a dry blend, and then melt blended to make the moisture-curable polymeric composition. In one embodiment, the components are added individually during the melt blending process to make the moisture-curable polymeric composition. In one embodiment one or more of the components are added as a masterbatch during the melt blending process to make the moisture-curable polymeric composition. In an embodiment, all the ingredients are melt-blended in one step. Regardless of the compounding technique employed, the resulting crosslinkable polymeric composition can be pelletized for later use in fabricating articles or directly fabricated into an article such as coated conductor.

In alternate embodiments, a starting polyolefin that does not contain hydrolyzable silane groups can be employed. In such embodiments, the initial polyolefin can be combined with an organic peroxide and heated at an elevated temperature (e.g., about 60° C., or at least above the melting point of the organic peroxide). Next, an unsaturated silane monomer can be combined with the peroxide-containing polyolefin, along with the halogenated polymer, metal mercaptide, and any additives desired, and compounded at an elevated temperature (e.g., about 125° C. or 140° C.). In such embodiments, the hydrolyzable silane monomer is grafted onto the polyolefin in situ to form the polyolefin containing hydrolyzable silane groups.

Crosslinked Polymeric Composition

The crosslinking reaction typically takes place following the melt blending and shaping, molding, or extrusion step by moisture-induced reaction between the grafted or copolymerized silane groups. The moisture-induced crosslinking can occur at elevated (e.g., 90° C.) or ambient (e.g., 23° C.) temperatures, with water permeating into the bulk polymer from the external environment (steam vulcanization tube, humid atmosphere or from a water bath or "sauna"). The water required for moisture-induced crosslinking may also be generated in situ as disclosed in U.S. Pat. Nos. 8,541,491 B2, 8,460,770 B2, 8,324,311 B2, European patent EP 2 195 380 B1, and European patent EP 2 170 986 B1. Thus, the moisture-induced crosslinking can even occur in a dry vulcanization tube that is conventionally used in making coated conductors. The fabricated article (such as a coated conductor) can continue to crosslink at ambient or room conditions of temperature (such as 23° C.) and humidity (such as 50 to 70 percent relative humidity).

In various embodiments, the resulting moisture-crosslinked polymeric composition can have a hot creep of less than 175%, less than 120%, or less than 100%. Hot creep is determined according to Insulated Cable Engineers Association standard number ICEA-T-28-562-2003. Additionally, the crosslinked polymeric composition can have a gel content of at least 30%, at least 40%, or at least 50%. Gel content is determined according to ASTM International ("ASTM") standard D2765. Furthermore, the crosslinked polymeric composition can have a limiting oxygen index of at least 20%, at least 21%, or at least 22%. Limiting oxygen index is determined according to ASTM standard D638.

Coated Conductor

A cable containing an insulation layer comprising the moisture-curable or crosslinked polymeric composition can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. In wire coating where the polymeric insulation is crosslinked after extrusion, the cable often passes immediately into a cure zone, such as a humid environment or water bath. Alternatively, crosslinking can be performed in ambient conditions using either in situ generated moisture or environmental moisture.

TEST METHODS

Density

Density is determined according to ASTM D792.

Melt Index

Melt index, or $I_2$, is measured in accordance by ASTM D1238, condition 190° C./2.16 kg, and is reported in grams eluted per 10 minutes.

Hot Creep

Hot creep is determined according to Insulated Cable Engineers Association standard number ICEA-T-28-562-2003.

Gel Content

Gel content is determined according to ASTM standard D2765.

Limiting Oxygen Index

Limiting oxygen index is determined according to ASTM standard D638 on specimens of 125-mil thickness.

Strain at Break

Elongation (strain at break) is measured according to ASTM D638 using Type IV test specimens at displacement rate of 20 mm/min.

Peak Stress

Tensile strength (peak stress) is measured according to ASTM D638 using Type IV test specimens at displacement rate of 20 mm/min.

Thermogravimetry

Thermogravimetry is conducted in platinum pans with a TA Instruments Model Q5000 under nitrogen (at flow rate of 100 $cm^3$/min) by raising the temperature from 30 to 900° C. at a rate of 10° C./min.

MATERIALS

The following materials are employed in the Examples, below.

SI-LINK™ DFDA-5451 NT is an ethylene-silane copolymer having a density of 0.922 g/$cm^3$, a melt index ($I_2$) of 1.5 g/10 min, and is commercially available from The Dow Chemical Company, Midland, Mich., USA.

SI-LINK™ AC DFDB-5451 NT is a scorch-retardant ethylene-silane copolymer having a density of 0.922 g/$cm^3$ a melt index ($I_2$) of 1.5 g/10 min, and is commercially available from The Dow Chemical Company, Midland, Mich., USA.

POE-g-Silane is a vinyltrialkoxysilane-grafted ENGAGE™ polyolefin elastomer having a density of 0.86 g/$cm^3$ a melt index ($I_2$) of 4 g/10 min.

SI-LINK™ AC DFDA-5488 NT is a masterbatch containing a silanol condensation catalyst and an antioxidant having a density of 0.930 g/$cm^3$ and a melt index ($I_2$) of 1.3 g/10 min. The silanol condensation catalyst is an acid and is present in an amount of less than 5 wt % based on the total weight of the masterbatch. The antioxidant is a phenolic compound, and is present in an amount of less than 6 wt % based on the total weight of the masterbatch. SI-LINK™ AC DFDA-5488 NT is commercially available from The Dow Chemical Company, Midland, Mich., USA.

SI-LINK™ DFDB-5400 NT is a masterbatch containing a brominated flame retardant and antimony trioxide. The brominated flame retardant is present in an amount of less than 50 wt %, based on the total weight of the masterbatch. The antimony trioxide is present in an amount of less than 20 wt %, based on the total weight of the masterbatch. SI-LINK™ DFDB-5400 NT is produced by The Dow Chemical Company, Midland, Mich., USA.

OxyVinyls™ 240F is a suspension-grade polyvinyl chloride ("PVC") having a typical inherent viscosity of 1.02 dl/g and a relative viscosity of 2.37. OxyVinyls™ 240F is commercially available from OxyVinyls, LP, Dallas, Tex., USA.

GEON™ 173 PVC is an emulsion-grade polyvinyl chloride ("PVC") having a typical inherent viscosity of 1.00 dl/g and a relative viscosity of 2.37. GEON™ 173 is commercially available from Mexichem Specialty Resins, Inc., Avon Lake, Ohio, USA.

Kaneka H727 is a chlorinated polyvinyl chloride ("CPVC"), which is commercially available from Kaneka North America LLC, Pasadena, Tex., USA.

Kaneka H829F is a CPVC, which is commercially available from Kaneka North America LLC, Pasadena, Tex., USA.

TYRIN™ 3611E is a chlorinated polyethylene ("CPE") having a density of 1.17 g/$cm^3$, a chlorine content of 36.0 wt %, and is commercially available from The Dow Chemical Company, Midland, Mich., USA.

The metal mercaptide employed is a mixture comprising 80 wt % dimethyltin bis(2-ethylhexyl mercaptoacetate) and 20 wt % monomethyltin tris(2-ethylhexyl mercaptoacetate).

AMPLIFY™ EA 100 is an ethylene ethyl acrylate copolymer having a density of 0.930 g/$cm^3$, a melt index of 1.3 g/10 min., a Shore A hardness at 1 sec of 87, and an ethyl acrylate content of 15 percent, which is commercially available from The Dow Chemical Company, Midland, Mich., USA.

NACURE™ B201 is a sulfonic acid silanol condensation catalyst available from King Industries, Inc., Norwalk, Conn., USA.

LOWINOX™ 221B46 is a sterically hindered phenolic antioxidant having the chemical name 2,2'-isobutylidene bis(4,6-dimethyl-phenol), which is commercially available from Addivant, Middlebury, Conn., USA.

IRGANOX™ 1010 is a sterically hindered phenolic antioxidant having the chemical name pentaerythritol tetrakis (3-(3,5-di-tert-butyl-4-hydroxyphenyl)propionate), which is commercially available from BASF Schweiz AG, Basel, Switzerland.

BAEROPAN™ MC 9754 KA is a calcium-zinc heat stabilizer commercially available from Baerlocher Production USA, Cincinnati, Ohio, USA. The composition of BAEROPAN™ MC 9754 KA can be found in EP 2470597 B1.

PLAS-CHEK™ 775 is epoxidized soybean oil commercially available from Ferro Corporation, Cleveland, Ohio, USA. The properties of PLAS-CHEK™ 775 are disclosed in the following paper: Sun, B., Chaudhary, B. I., Shen, C., Mao, D., Yuan, D., Dai, G., Li, B., Cogen, J. M., *Polymer Engineering and Science*, 53, 1645-1656 (2013).

LEVAPREN™ 600 is an ethylene vinyl acetate copolymer having a vinyl acetate content of 60±1.5 wt %, a Mooney viscosity value of 27±4 (according to ASTM D1646), and is commercially available from Lanxess AG, Cologne, Germany.

PHOSFLEX™ 71B is a butylated triphenyl phosphate ester plasticizer, which is commercially available from ICL Industrial Products, Tel Aviv, Israel.

NIPOL™ DP5161P is a nitrile butadiene rubber having ("NBR") that is commercially available from Zeon Chemicals.

SILQUEST™ A-137 is octyl triethoxysilane, and is commercially available from Momentive Performance Materials, Inc., Columbus, Ohio, USA.

MICROFINE™ AO9 is antimony trioxide commercially available from Chemtura Corporation, Philadelphia, Pa., USA.

BRIGHTSUN™ HB is antimony trioxide commercially available from Albemarle Corporation, Baton Rouge, La., USA.

SAYTEX™ 8010 is a brominated flame retardant, ethane-1,2-bis(pentabromophenyl), which is commercially available from Albemarle Corporation, Baton Rouge, La., USA.

CHINIASSORB™ 119 is a UV light stabilizer having the CAS No. 106990-43-6, which is commercially available from BASF SE, Ludwigshafen, Germany.

EXAMPLES

Example 1

Prepare three Comparative Samples (CS1-CS3) according to the following method. A 250-cm³ Brabender mixing bowl with cam rotors is used to make 250 grams of each composition shown in Table 1, below. The ethylene-silane copolymer and PVC are hand-mixed in a container at ambient temperature, then loaded into the Brabender and mixed for three minutes, followed by addition of catalyst and antioxidant and mixed for another five minutes. Mixing is performed at 40 rpm and 125° C. The mixture is then removed, cold-pressed into a thin sheet, and compression molded immediately. The molding conditions are 150° C. for six minutes (500 psi for three minutes, followed by 2500 psi for three minutes); then the composition is cooled to 30° C. at 2500 psi and removed. The molded compositions are then cured in 90° C. water for six hours.

TABLE 1

Compositions of CS1-CS3

| Sample | DFDA-5451 (wt %) | OxyVinyls™ 240F PVC (wt %) | Nacure™ B201 (wt %) | Lowinox™ 22IB46 (wt %) |
| --- | --- | --- | --- | --- |
| CS1 | 99.65 | — | 0.15 | 0.2 |
| CS2 | 69.80 | 30 | — | 0.2 |
| CS3 | 69.65 | 30 | 0.15 | 0.2 |

Analyze CS1-CS3 according to the Test Methods provided above. The results are provided in Table 2, below.

TABLE 2

Properties of CS1-CS3

| Sample | Discolored after mixing and molding? | Molded Specimen Thickness (mil) for all Properties Except LOI | Gel Content (wt %) | Hot Creep (%) | LOI (%) |
| --- | --- | --- | --- | --- | --- |
| CS1 | No | 50 | 81 | 27 | 18 |
| CS2 | Yes (amber) | 56 | 15 | Broke by stretching | 22 |
| CS3 | Yes (even more amber than CS2; slightly brown) | 60 | 88 | 29 | 22 |

As seen in the results provided in Table 2, CS1 is not discolored after mixing and molding, and exhibits a high degree of crosslinking after curing in 90° C. water, as shown by gel content and hot creep, but its limiting oxygen index ("LOT") is relatively low. CS2 and CS3 exhibit satisfactorily high LOI, but are discolored after mixing and molding (amber/brown color being evidence of significant thermal degradation). Furthermore, CS2 is not sufficiently crosslinked after moisture crosslinking. Note that the inclusion of a silanol condensation catalyst (NACURE™ B201 Sulfonic Acid) with the blend of PVC and DFDA-5451 SI-LINK™ Ethylene-Silane Copolymer in CS3, without a metal mercaptide, led to increased discoloration.

Example 2

Prepare five Comparative Samples (CS4-CS8) according to the following procedure. A 40-cm³ Brabender mixing bowl with cam rotors is used to make 40 grams of each composition shown in Table 3, below. All ingredients are hand-mixed in a container at ambient temperature, then loaded into the Brabender and mixed for five minutes. Mixing is performed at 40 rpm and 180° C. The mixture is then removed, cold-pressed into a thin sheet, and compression molded immediately. The molding conditions are 180° C. for six minutes (500 psi for three minutes, followed by 2500 psi for three minutes); then the composition is cooled to 30° C. at 2500 psi and removed. The molded compositions are then cured at 23° C. and 70% relative humidity for 48 hours.

TABLE 3

Compositions of CS4-CS8

| Sample | DFDA-5451 (wt %) | OxyVinyls™ 240F PVC (wt %) | Nacure™ B201 (wt %) | Lowinox™ 221B46 (wt %) | Baeropan™ MC9754 KA (wt %) | Plas-Chek™ 775 ESO (wt %) |
|---|---|---|---|---|---|---|
| CS4 | 99.65 | — | 0.15 | 0.2 | — | — |
| CS5 | 57.80 | 40 | — | 0.2 | 2 | — |
| CS6 | 57.65 | 40 | 0.15 | 0.2 | 2 | — |
| CS7 | 57.80 | 40 | — | 0.2 | — | 2 |
| CS8 | 57.65 | 40 | 0.15 | 0.2 | — | 2 |

Analyze CS4-CS8 according to the Test Methods provided above. The results are provided in Table 4, below.

TABLE 4

Properties of CS4-CS8

| Sample | Discolored after mixing and molding? | Molded Specimen Thickness (mil) | Gel Content (wt %) | Hot Creep (%) |
|---|---|---|---|---|
| CS4 | No | 37 | 96 | 18 |
| CS5 | Yes (grey/black/green) | 37 | 100 | 12 |
| CS6 | Yes (grey/black/green) | 38 | 92 | 11 |
| CS7 | Yes (amber) | 33 | 38 | Broke by stretching |
| CS8 | Yes (less amber than CS7) | 35 | 44 | Broke by stretching |

As seen in the results provided in Table 4, CS4 is not discolored after mixing and molding, and exhibits a high degree of crosslinking after curing at 23° C. and 70% relative humidity (deduced from gel content and hot creep). However, as this was the same composition as CS1, its LOI would be expected to be too low. CS5 and CS6 exhibit satisfactorily high gel contents and low hot creep after moisture curing, but the compositions are discolored after mixing and molding (grey/black/green color being evidence of significant thermal degradation). CS7 and CS8 do not yield satisfactorily high gel contents and break by stretching in the hot creep test after moisture curing, and the compositions are discolored after mixing and molding (amber color being evidence of significant thermal degradation). It is particularly surprising that the Baeropan™ MC 9754 KA (mixed calcium and zinc metal salts with β-diketone) and Plas-Chek™ 775 Epoxidized Soybean Oil did not function effectively as heat stabilizers for the compositions, in the absence of a metal mercaptide.

Example 3

Prepare four Comparative Samples (CS9-CS12) and four Samples (S1-S4) according to the following procedure. A 40-cm³ Brabender mixing bowl with cam rotors is used to make 50 grams of each composition shown in Table 5, below. Liquid mercaptide and plasticizers are added separately to the PVC at ambient temperature. Then, all ingredients are hand-mixed in a container at ambient temperature, then loaded into the Brabender and mixed for eight minutes. Mixing is performed at 40 rpm and 125° C. The mixture is then removed, cold-pressed into a thin sheet, and compression molded immediately. The molding conditions are 150° C. for six minutes (500 psi for three minutes, followed by 2500 psi for three minutes); then the composition is cooled to 30° C. at 2500 psi and removed. The molded compositions are then cured at 23° C. and 70% relative humidity for 68 hours.

TABLE 5

Compositions of CS9-CS12 and S1-S4

| Sample | DFDA-5451 (wt %) | OxyVinyls™ 240F PVC (wt %) | Levapren™ 600 EVA (wt %) | Nacure™ B201 (wt %) | Lowinox™ 221B46 (wt %) | Metal Mercaptide (wt %) | Phosflex™ 71B (wt %) |
|---|---|---|---|---|---|---|---|
| S1 | 58.80 | 40 | — | — | 0.2 | 1 | — |
| S2 | 58.65 | 40 | — | 0.15 | 0.2 | 1 | — |
| S3 | 54.65 | 40 | — | 0.15 | 0.2 | 1 | 4 |
| S4 | 53.65 | 40 | 5 | 0.15 | 0.2 | 1 | — |
| CS9 | 99.65 | — | — | 0.15 | 0.2 | — | — |
| CS10 | 59.80 | 40 | — | — | 0.2 | — | — |
| CS11 | 59.65 | 40 | — | 0.15 | 0.2 | — | — |
| CS12 | 98.80 | — | — | — | 0.2 | 1 | — |

Analyze CS9-CS12 and S1-S4 according to the Test Methods provided above. The results are provided in Table 6, below.

TABLE 6

Properties of CS9-CS12 and S1-S4

| Sample | Discolored after mixing and molding? | Molded Specimen Thickness (mil) | Gel Content (wt %) | Hot Creep (%) |
|---|---|---|---|---|
| S1 | No | 49 | 81 | 33 |
| S2 | No | 48 | 83 | 33 |
| S3 | No | 47 | 74 | 32 |
| S4 | No | 48 | 72 | 44 |
| CS9 | No | 43 | 73 | 26 |
| CS10 | Yes (amber) | 44 | 30 | Broke by stretching |
| CS11 | Yes (slightly more amber than CS10) | 46 | 83 | 19 |
| CS12 | No | 48 | 76 | Broke by stretching |

CS9 is not discolored after mixing and molding and exhibits a high degree of crosslinking after curing at 23° C. and 70% relative humidity (deduced from gel content and hot creep). However, as this was the same composition as CS1 and CS4, its LOI would be expected to be too low. CS10 and CS11 would be expected to exhibit satisfactorily high LOI (since the compositions comprise more PVC than CS2 and CS3, both of which yield acceptably high values of LOI), but are discolored after mixing and molding (amber color being evidence of significant thermal degradation). Furthermore, CS10 is not sufficiently crosslinked after moisture crosslinking. CS12 reveals that the mercaptide does not function as an effective silanol condensation catalyst (in terms of the hot creep requirement), in spite of the high gel contents obtained with CS12 after extraction in boiling decalin (crosslinking may have occurred during decalin extraction at ca. 190° C.). Surprisingly, S1 to S4 are not only thermally stable (not degraded), but are also sufficiently crosslinked when aged in a humid environment. S1 to S4 would also be expected to exhibit satisfactorily high LOI (since the compositions comprise more PVC than CS2 and CS3, both of which yield acceptably high LOI values). Furthermore, inclusion of a silanol condensation catalyst (Nacure™ B201 Sulfonic Acid) with the blend of PVC and DFDA-5451 in CS11, without a metal mercaptide, led to slightly increased discoloration.

Example 4

Prepare two Comparative Samples (CS13 and CS14) and one Sample (S5) according to the following procedure. A 40-cm³ Brabender mixing bowl with cam rotors is used to make 55 grams of each composition shown in Table 7, below. Liquid mercaptide is added separately to the PVC at ambient temperature. Then, all ingredients are hand-mixed in a container at ambient temperature, then loaded into the Brabender. For CS13 and CS 14, mixing is performed at 40 rpm and 190° C. for five minutes. For S5, mixing is performed at 40 rpm and 190° C. for three minutes. In all cases, the mixture is then removed, cold-pressed into a thin sheet, and compression molded immediately. The molding conditions for CS13 and CS14 are 190° C. for six minutes (500 psi for three minutes, followed by 2500 psi for three minutes); then the composition is cooled to 30° C. at 2500 psi and removed. The molding conditions for S5 are 190° C. for three minutes (500 psi for one minute, followed by 2500 psi for two minutes); then the composition is cooled to 30° C. at 2500 psi and removed. For CS13 and CS14, the molded compositions are then cured at 23° C. and 70% relative humidity for 114 hours. For S5, the molded composition is cured at 23° C. and 70% relative humidity for 68 hours.

TABLE 7

Compositions of CS13, CS14, and S5

| Sample | DFDA-5451 (wt %) | OxyVinyls™ 240F PVC (wt %) | Nacure™ B201 (wt %) | Lowinox™ 22IB46 (wt %) | Metal Mercaptide (wt %) |
|---|---|---|---|---|---|
| S5 | 58.8 | 40 | — | 0.2 | 1 |
| CS13 | 99.6 | — | 0.2 | 0.2 | — |
| CS14 | 99.6 | — | — | 0.2 | 0.2 |

Analyze CS13, CS14, and S5 according to the Test Methods provided above. The results are provided in Table 8, below.

TABLE 8

Properties of CS13, CS14, and S5

| Sample | Discolored after mixing and molding? | Molded Specimen Thickness (mil) | Gel Content (wt %) | Hot Creep (%) |
|---|---|---|---|---|
| S5 | No | 50 | 80 | 26 |
| CS13 | No | 45 | 74 | 30 |
| CS14 | No | 47 | 77 | Broke by stretching |

The results provided in Table 8 confirm that S5 (same as S1, but mixed and molded at a higher temperature) is not discolored (degraded) and is sufficiently crosslinked when aged in a humid environment. Furthermore, the results obtained with CS14 confirm that the mercaptide is ineffective as a silanol condensation catalyst during aging of the ethylene silane copolymer in a humid environment in the absence of PVC.

Example 5

Prepare three Samples (S6-S8) according to the following procedure. A 40-cm³ Brabender mixing bowl with cam rotors is used to make 55 grams of each composition shown in Table 9, below. Liquid mercaptide is added separately to the PVC at ambient temperature. Then, all ingredients are hand-mixed in a container at ambient temperature, then loaded into the Brabender and mixed for eight minutes. Mixing is performed at 40 rpm and 125° C. The mixture is then removed, cold-pressed into a thin sheet, and compression molded immediately. The molding conditions are 150° C. for six minutes (500 psi for three minutes, followed by 2500 psi for three minutes); then the composition is cooled to 30° C. at 2500 psi and removed. The molded compositions are then cured at 23° C. and 70% relative humidity for 112 hours.

TABLE 9

Compositions of S6-S8

| Sample | DFDA-5451 (wt %) | POE-g-Silane (wt %) | OxyVinyls™ 240F PVC (wt %) | Nipol™ DP5161P NBR (wt %) | Lowinox™ 22IB46 (wt %) | Metal Mercaptide (wt %) |
|---|---|---|---|---|---|---|
| S6 | 58.8 | — | 40 | — | 0.2 | 1 |
| S7 | — | 58.8 | 40 | — | 0.2 | 1 |
| S8 | — | 56.8 | 38 | 4 | 0.2 | 1 |

Analyze S6-S8 according to the Test Methods provided above. The results are provided in Table 10, below.

TABLE 10

Properties of S6-S8

| Sample | Discolored after mixing and molding? | Molded Specimen Thickness (mil) | Gel Content (wt %) | Hot Creep (%) |
|---|---|---|---|---|
| S6 | No | 44 | 83 | 50 |
| S7 | No | 47 | 92 | 11 |
| S8 | No | 49 | 91 | 10 |

From Table 10, the results with S6 confirm those obtained with S1 and S5 (same compositions). In S7 and S8, the silane-functionalized polymer was changed to a different silane functionalized polyolefin, and the latter comprising a different optional polymeric compatibilizer from that in S4, but there is still no discoloration and the compositions are adequately crosslinked.

Example 6

Prepare four Comparative Samples (CS15-CS18) and five Samples (S9 to S13) according to the following procedure. A 40-cm³ Brabender mixing bowl with cam rotors is used to make 55 grams of each composition shown in Table 11, below. The compositions are mixed and molded according to the same procedure described in Example 5, above. The molded compositions are then cured at 23° C. and 70% relative humidity for 96 hours.

TABLE 11

Compositions of CS15-CS18 and S9-S13

| Sample | DFDA-5451 (wt %) | POE-g-Silane (wt %) | OxyVinyls ™ 240F PVC (wt %) | Lowinox ™ 22IB46 (wt %) | Metal Mercaptide (wt %) |
|---|---|---|---|---|---|
| S9 | 58.8 | — | 40 | 0.2 | 1 |
| S10 | 29.4 | 29.4 | 40 | 0.2 | 1 |
| S11 | — | 58.8 | 40 | 0.2 | 1 |
| S12 | — | 48.8 | 50 | 0.2 | 1 |
| S13 | — | 38.8 | 60 | 0.2 | 1 |
| CS15 | 99.8 | — | — | 0.2 | — |
| CS16 | — | 99.8 | — | 0.2 | — |
| CS17* | — | 28.8 | 70 | 0.2 | 1 |
| CS18* | — | 18.8 | 80 | 0.2 | 1 |

*Samples resulted in poor mixing and incorporation of PVC with POE-g-Silane. Unable to compression mold specimens of sufficient quality to be used for testing.

Analyze CS15, CS16, and S9-S13 according to the Test Methods provided above. The results are provided in Table 12, below.

TABLE 12

Properties of CS15, CS16, and S9-S13

| Sample | Discolored after mixing and molding? | Molded Specimen Thickness (mil) | Gel Content (wt %) | Hot Creep (%) |
|---|---|---|---|---|
| S9 | No | 51 | 82 | 60 |
| S10 | No | 50 | 82 | 24 |
| S11 | No | 48 | 91 | 15 |
| S12 | No | 48 | 90 | 12 |
| S13 | No | 51 | 92 | 13 |
| CS15 | No | 41 | 2 | Broke by stretching |
| CS16 | No | 42 | 2 | Broke by stretching |

As seen in Table 12, CS15 and CS16 show that the silane-functionalized polyolefins cannot be crosslinked in the absence of a silanol condensation catalyst. The results of S9 and S11 confirm those obtained with S1, S5, S6, and S7 (same compositions). In S10, a combination of the two different silane functionalized polyolefins is used, but there is still no discoloration, and the compositions are adequately crosslinked. S12 and S13 show that as much as 60 wt % of PVC can be used in the inventive compositions to obtain the desired results. CS17 and CS18 show that attempts to incorporate 70 wt % and 80 wt % of PVC in the compositions are unsuccessful, due to poor mixing and the inability to compression mold specimens of quality good enough to be used for testing.

Example 7

Prepare a Sample (S14) according to the following procedure. A 40-cm³ Brabender mixing bowl with cam rotors is used to make 55 grams of the composition shown in Table 13, below. Liquid mercaptide is added separately to the PVC at ambient temperature. Then, all ingredients are hand-mixed in a container at ambient temperature, then loaded into the Brabender and mixed for eight minutes. Mixing is performed at 40 rpm and 125° C. The mixture is then removed, cold-pressed into a thin sheet, and compression molded immediately. The molding conditions are 150° C. for six minutes (500 psi for two minutes, followed by 2500 psi for four minutes); then the composition is cooled to 30° C. at 2500 psi and removed. The molded compositions are then cured at 23° C. and 70% relative humidity for 72 hours.

TABLE 13

Composition of S14

| Sample | DFDA-5451 (wt %) | OxyVinyls ™ 240F PVC (wt %) | Silquest ™ A-137 (wt %) | Lowinox ™ 22IB46 (wt %) | Metal Mercaptide (wt %) |
|---|---|---|---|---|---|
| S14 | 57.8 | 40 | 1 | 0.2 | 1 |

Analyze S14 according to the Test Methods provided above. The results are provided in Table 14, below.

TABLE 14

Properties of S14

| Sample | Discolored after mixing and molding? | Molded Specimen Thickness (mil) | Gel Content (wt %) | Hot Creep (%) |
|---|---|---|---|---|
| S14 | No | 46 | 81 | 58 |

The results in Table 14 demonstrate that octyltriethoxysilane can be introduced in the inventive composition as an optional moisture-cure-control additive while still retaining the desired balance of properties.

Example 8

Prepare two Comparative Samples (CS19 and CS20) and four Samples (S15-S18) according to the following procedure. A 250-cm³ Brabender mixing bowl with cam rotors is used to make 250 grams of each composition shown in Table 15, below. Liquid mercaptide is added separately to the PVC at ambient temperature. Then, all ingredients are hand-mixed in a container at ambient temperature, then loaded into the Brabender and mixed for eight minutes. Mixing is performed at 40 rpm and 125° C. The mixture is then removed, cold-pressed into a thin sheet, and compression molded immediately. The molding conditions are 150° C. for six minutes (500 psi for 1.5 minutes, followed by 2500 psi for 4.5 minutes), then cooled to 30° C. at 2500 psi and removed. The molded compositions are then cured at 23° C. and 70% relative humidity for 240 hours.

TABLE 15

Compositions of CS19, CS20, and S15-S18

| Sample | DFDA-5451 (wt %) | POE-g-Silane (wt %) | OxyVinyls™ 240F PVC (wt %) | Nacure™ B201 (wt %) | Lowinox™ 22IB46 (wt %) | Metal Mercaptide (wt %) | Microfine™ AO9 (wt %) |
|---|---|---|---|---|---|---|---|
| S15 | — | 49 | 50 | — | 0.2 | 1 | — |
| S16 | — | 46 | 50 | — | 0.2 | 1 | 3 |
| S17 | — | 43 | 50 | — | 0.2 | 1 | 6 |
| S18 | — | 40 | 50 | — | 0.2 | 1 | 9 |
| CS19 | 99.6 | — | — | 0.2 | 0.2 | — | — |
| CS20 | — | 99.6 | — | 0.2 | 0.2 | — | — |

Analyze CS19, CS20, and S15-S18 according to the Test Methods provided above. The results are provided in Table 16, below.

TABLE 16

Properties of CS19, CS20, and S15-S18

| Sample | Discolored after mixing and molding? | Molded Specimen Thickness (mil) for all properties except LOI | Gel Content (wt %) | Hot Creep (%) | LOI (%) |
|---|---|---|---|---|---|
| S15 | No | 56 | 91 | 12 | 26 |
| S16 | No | 63 | 90 | 11 | 31 |
| S17 | No | 68 | 90 | 12 | 32 |
| S18 | No | 68 | 90 | 6 | 32 |
| CS19 | No | 51 | 79 | 20 | 18 |
| CS20 | Yes (brown) | 50 | 88 | 20 | 18 |

As seen in Table 16, CS19 and CS20 depict the properties of the moisture-crosslinked silane-functionalized polyolefins, with use of a silanol condensation catalyst. S15 to S18 show the properties of the inventive compositions that do not contain silanol condensation catalyst, but instead utilize a metal mercaptide (which was shown in CS12 and CS14 to be an ineffective silanol condensation catalyst for moisture cure in the absence of a halogenated polymer). By using 50 wt % of a halogenated polymer (PVC), with an optional flame retardant synergist, dramatic improvements in LOI are observed along with satisfactory degree of crosslinking and no evidence of thermal degradation.

Example 9

Prepare three Comparative Samples (CS21-CS23) and two Samples (S19 and S20) according to the following procedure. A 250-cm³ Brabender mixing bowl with cam rotors is used to make 250 grams of each composition shown in Table 17, below. The compositions are mixed and molded according to the same procedure described in Example 8, above. The molded compositions are then cured at 23° C. and 70% relative humidity for 64 hours.

Analyze CS21-CS23, S19, and S20 according to the Test Methods provided above. The results are provided in Table 18, below.

TABLE 18

Properties of CS21-23, S19, and S20

| Sample | Discolored after mixing and molding? | Molded Specimen Thickness (mil) for all properties except LOI | Gel Content (wt %) | Hot Creep (%) | LOI (%) |
|---|---|---|---|---|---|
| S19 | No | 62 | 87 | 34 | 23 |
| S20 | No | 61 | 85 | 33 | 25 |
| CS21 | No | 57 | 50 | 27 | 25 |
| CS22 | No | 52 | 51 | 15 | 26 |
| CS23 | No | 53 | 80 | 23 | 18 |

The results in Table 18 show that S19 and S20 are similar or better in terms of LOI, degree of crosslinking, and thermal stability compared to CS21 and CS22 (the latter two comprising a brominated flame retardant). CS23 is relatively inferior in terms of LOI.

Example 10

Prepare a Comparative Sample (CS23) and three Samples (S21-S23) according to the following procedure. A 250-cm³ Brabender mixing bowl with cam rotors is used to make 250 grams of each composition shown in Table 19, below. DFDB-5451, DFDB-5400 NT, and DFDA-5488 are all dried for approximately 24 hours before use, under vacuum of 29 inches gauge of mercury at a temperature of 50° C. After drying, these materials are sealed under nitrogen in foil bags, and the bags are opened just before use. Liquid mercaptide is added separately to the PVC at ambient temperature. Then, all ingredients are hand-mixed in a container at ambient temperature, then loaded into the Brabender and mixed for eight minutes. Mixing is performed at 40 rpm and 125° C. The mixture is then removed, cold-pressed into a

TABLE 17

Compositions of CS21-23, S19, and S20

| Sample | DFDA-5451 (wt %) | OxyVinyls™ 240F PVC (wt %) | Nacure™ B201 (wt %) | Lowinox™ 22IB46 (wt %) | Metal Mercaptide (wt %) | Saytex™ 8010 (wt %) | Microfine™ AO9 (wt %) |
|---|---|---|---|---|---|---|---|
| S19 | 58.6 | 40 | 0.2 | 0.2 | 1 | — | — |
| S20 | 57.1 | 40 | 0.2 | 0.2 | 1 | — | 1.5 |
| CS21 | 59.6 | — | 0.2 | 0.2 | — | 40 | — |
| CS22 | 58.1 | — | 0.2 | 0.2 | — | 40 | 1.5 |
| CS23 | 99.6 | — | 0.2 | 0.2 | — | — | — | thin sheet, and compression molded immediately. The molding conditions are 150° C. for six minutes (500 psi for two minutes, followed by 2500 psi for four minutes); then the composition is cooled to 30° C. at 2500 psi and removed. The molded compositions are then cured at 23° C. and 70% relative humidity for 162 hours.

TABLE 19

Compositions of CS24 and S21 to S23

| Sample | DFDB-5451 (wt %) | Geon 173 PVC (wt %) | DFDA-5488 | Metal Mercaptide (wt %) | DFDB-5400 NT (wt %) |
|---|---|---|---|---|---|
| S21 | 69 | 6.3 | 5 | 1 | 18.7 |
| S22 | 69 | 12.5 | 5 | 1 | 12.5 |
| S23 | 69 | 25 | 5 | 1 | — |
| CS24 | 70 | — | 5 | — | 25 |

Analyze CS24 and S21-S23 according to the Test Methods provided above. The results are provided in Table 20, below.

TABLE 20

Properties of CS24 and S21-S23

| Sample | Discolored after mixing and molding? | Molded Specimen Thickness (mil) for all properties except LOI | Hot Creep (%) | LOI (%) |
|---|---|---|---|---|
| S21 | No | 56 | 53 | 24 |
| S22 | No | 62 | 37 | 23 |
| S23 | No | 60 | 46 | 22 |
| CS24 | No | 52 | 64 | 24 |

As seen in Table 20, S21 to S23 demonstrate the use of an emulsion-grade PVC (Geon 173) and its combinations with a brominated flame-retardant masterbatch to obtain similar LOI, degree of crosslinking, and thermal stability as CS24 (made without the chlorinated polymer).

Example 11

Prepare flame-retardant masterbatches of a Comparative Sample (CS25) and seven Samples (S24-S30) according to the following procedure. A 250-cm$^3$ Brabender mixing bowl with cam rotors is used to make 250 grams of each composition (except CS25) shown in Table 21, below. CS25 is 100 wt % DFDB-5400 NT. For S24-S30, liquid mercaptide is added separately to the PVC at ambient temperature. Then, all ingredients are hand-mixed in a container at ambient temperature, then loaded into the Brabender and mixed for five minutes. Mixing is performed at 40 rpm and 180° C. The mixture is then removed, cold-pressed into a thin sheet, and compression molded immediately. The molding conditions are 180° C. for six minutes (500 psi for three minutes, followed by 2500 psi for three minutes); then the composition is cooled to 30° C. at 2500 psi and removed.

TABLE 21

Compositions of S24-S30

| | S24 | S25 | S26 | S27 | S28 | S29 | S30 |
|---|---|---|---|---|---|---|---|
| Amplify ™ EA 100 (wt %) | 38.89 | 37.89 | 37.89 | 37.89 | 37.89 | 37.89 | 0.39 |
| Oxy-Vinyls ™ 240F PVC (wt %) | 12.5 | 12.5 | — | — | — | — | 12.5 |
| Geon 173 PVC (wt %) | — | — | — | — | 12.5 | — | — |
| Kaneka H727 CPVC (wt %) | — | — | 12.5 | — | — | — | — |
| Kaneka H829F CPVC (wt %) | — | — | — | 12.5 | — | — | — |
| Tyrin ™ 3611E CPE (wt %) | 10 | 10 | 10 | 10 | 10 | 22.5 | 47.5 |
| Irganox ™ 1010 (wt %) | 0.1 | 0.1 | 0.1 | 0.1 | 0.1 | 0.1 | 0.1 |
| Metal Mercaptide (wt %) | 1 | 2 | 2 | 2 | 2 | 2 | 2 |
| Saytex ™ 8010 (wt %) | 22.5 | 22.5 | 22.5 | 22.5 | 22.5 | 22.5 | 22.5 |
| Brightsun HB (wt %) | 15 | 15 | 15 | 15 | 15 | 15 | 15 |
| Chimassorb ™ 119 (wt %) | 0.01 | 0.01 | 0.01 | 0.01 | 0.01 | 0.01 | 0.01 |

Analyze CS25 and S24-S30 according to the Test Methods provided above. The results are provided in Table 22, below.

TABLE 22

Properties of CS25 and S24-S30

| Sample | Discolored after mixing and molding? | Molded Specimen Thickness (mil) for tensile properties | Peak Stress (psi) | Strain at Break (%) | LOI (%) |
|---|---|---|---|---|---|
| S24 | No | 51 | 977 | 288 | 29 |
| S25 | No | 50 | 900 | 263 | 28 |
| S26 | No | 51 | 792 | 224 | 29 |
| S27 | No | 51 | 786 | 224 | 30 |
| S28 | No | 53 | 930 | 270 | 31 |
| S29 | No | 46 | 1505 | 626 | 29 |
| S30 | No | 49 | 1148 | 334 | 41 |
| CS25 | No | 71 | 990 | 542 | 42 |

As seen in Table 22, S24 to S30 exhibit desirably good tensile properties and LOI in comparison with CS25. Thermogravimetry assessments of the S24 to S30 flame-retardant masterbatches are conducted in comparison with those of CS25 flame-retardant masterbatch and DFDA-5451 ethylene-silane copolymer. All the S24 to S30 masterbatches exhibit the desirable behaviors for flame retardancy in thermogravimetry (data not shown).

Example 12

Prepare a Comparative Sample (CS26) and a Sample (S31) according to the following procedure. A 250-cm$^3$ Brabender mixing bowl with cam rotors is used to make 300 grams of each composition shown in Table 23, below. All ingredients are hand-mixed in a container at ambient temperature, then loaded into the Brabender and mixed for eight minutes. Mixing is performed at 40 rpm and 180° C. The mixture is then removed, cold-pressed into a thin sheet, and compression molded immediately. The molding conditions are 180° C. for six minutes (500 psi for two minutes, followed by 2500 psi for four minutes); then the composition is cooled to 30° C. at 2500 psi and removed. The molded compositions are then cured at 23° C. and 70% relative humidity for 792 hours.

TABLE 23

Compositions of CS26 and S31

| Sample | DFDA-5451 (wt %) | S30 (flame-retardant masterbatch) (wt %) | CS25 (flame-retardant masterbatch) (wt %) | Nacure ™ B201 (wt %) | Lowinox ™ 22IB46 (wt %) |
|---|---|---|---|---|---|
| S31 | 74.6 | 25 | — | 0.2 | 0.2 |
| CS26 | 74.6 | — | 25 | 0.2 | 0.2 |

Analyze CS26 and S31 according to the Test Methods provided above. The results are provided in Table 24, below.

TABLE 24

Properties of CS26 and S31

| Sample | Discolored after mixing and molding? | Molded Specimen Thickness (mil) for all Properties Except LOI | Hot Creep (%) | Peak Stress (psi) | Strain at Break (%) | LOI (%) |
|---|---|---|---|---|---|---|
| S31 | No | 61 | 23 | 1570 | 156 | 23 |
| CS26 | No | 53 | 19 | 2054 | 289 | 23 |

As seen in Table 24, the properties of S31 are quite good, and comparable to those of CS26. Additionally, both S31 and CS26 performed similarly in thermogravimetry assessments (data not shown).

The invention claimed is:

1. A moisture-curable polymeric composition, comprising:
   (a) a polyolefin having hydrolyzable silane groups;
   (b) a halogenated polymer; and
   (c) a metal mercaptide.

2. The moisture-curable polymeric composition of claim 1, wherein said polyolefin having hydrolyzable silane groups is present in an amount ranging from 35 to 75 weight percent, based on the total weight of said moisture-curable polymeric composition; wherein said halogenated polymer is present in an amount ranging from 5 to 60 weight percent, based on the total weight of said moisture-curable polymeric composition; wherein said metal mercaptide is present in an amount ranging from 0.1 to 5 weight percent, based on the total weight of said moisture-curable polymeric composition.

3. The moisture-curable polymeric composition of claim 1, wherein said moisture-curable polymeric composition contains no additional silanol condensation catalyst that is present in an amount sufficient to catalyze moisture cross-linking of said moisture-curable polymeric composition upon exposure to a humid environment.

4. The moisture-curable polymeric composition of claim 1, wherein said metal mercaptide has the following formula:

wherein each $R^1$ is independently selected from an alkyl group, an alkenyl group, an aryl group, an aralkyl group, an alkaryl group, a cycloalkyl group, and a cycloalkenyl group;

wherein each $R^2$ is independently selected from an alkyl group, an alkenyl group, an aryl group, an aralkyl group, an alkaryl group, a cycloalkyl group, a cycloalkenyl group, or a structure selected from the following formulas (1) through (6):

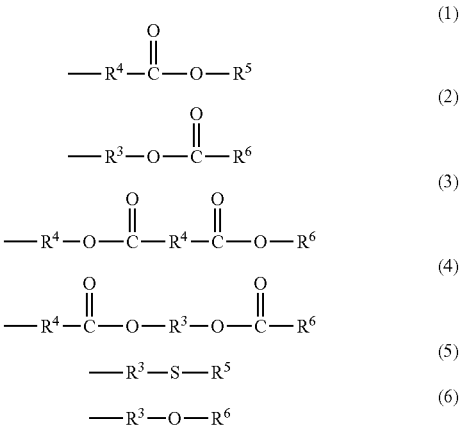

wherein $R^3$ is selected from an alkylene group having at least 2 carbon atoms, an arylene group, an alkenylene group, a cycloalkylene group, or a cycloalkenylene group, wherein $R^4$ is selected from an alkylene group, an arylene group, and alkenylene group, a cycloalkylene group, or a cycloalkenylene group, wherein $R^5$ is —H or $R^6$, wherein $R^6$ is selected from an alkyl group, an alkenyl group, an aryl group, an aralkyl group, an alkaryl group, a cycloalkyl group, and a cycloalkenyl group, wherein M is a metal selected from tin, antimony, zinc, and calcium, wherein y is equal to the oxidation state of metal M, wherein x can be any integer from 0 to y−1, inclusive, wherein z can be any integer from 1 to y, inclusive, wherein x+z=y.

5. The moisture-curable polymeric composition of claim 4, wherein M is tin; wherein $R^1$ is an alkyl group having from 1 to 6 carbon atoms; wherein $R^2$ is formula (1); wherein $R^4$ is an alkylene group having from 1 to 6 carbon atoms; wherein $R^5$ is an alkyl group having from 1 to 12 carbon atoms; wherein y is 4; wherein x is from 1 to 2, inclusive; wherein z is from 2 to 3, inclusive.

6. The moisture-curable polymeric composition of claim 5, wherein said metal mercaptide is selected from the following formulas (7) and (8), and mixtures thereof:

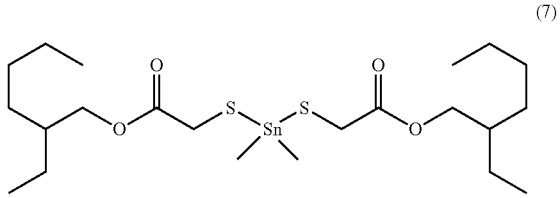

-continued

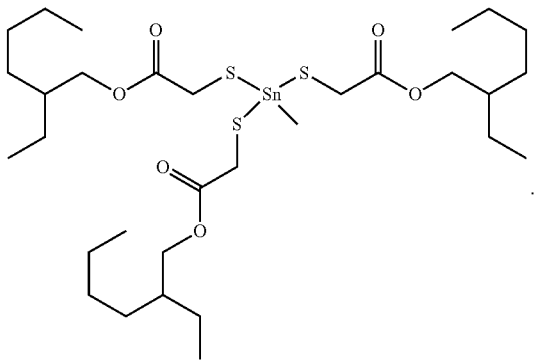

(8)

7. The moisture-curable polymeric composition of claim 1, wherein said halogenated polymer is selected from the group consisting of polyvinyl chloride ("PVC"); chlorinated polyvinyl chloride ("CPVC"); chlorinated polyethylene; chlorinated natural and synthetic rubber; rubber hydrochloride; chlorinated polystyrene; brominated polystyrene; brominated natural and synthetic rubber; polyvinyl bromide; butadiene styrene brominated copolymer; polyvinyl fluoride; copolymers of vinyl chloride with a copolymerizable ethylenically unsaturated material selected from vinyl acetate, vinyl butyrate, vinyl benzoate, vinylidene chloride, an alkyl fumarate, an alkyl maleate, vinyl propionate, an alkyl acrylate, an alkyl methacrylate, methyl alpha-chloroacrylate, styrene, trichloroethylene, a vinyl ether, a vinyl ketone, 1-fluoro-2-chloroethylene, acrylonitrile, chloroacrylonitrile, allylidene diacetate, chloroallylidene diacetate, and mixtures of two or more thereof; wherein said polyolefin having hydrolyzable silane groups is selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, such interpolymer having a hydrolyzable silane grafted to its backbone.

8. A crosslinked polymeric composition prepared from the moisture-curable polymeric composition of claim 1.

9. The crosslinked polymeric composition of claim 8, wherein said crosslinked polymeric composition has a hot creep of less than 175%, wherein said crosslinked polymeric composition has a gel content of at least 30 weight percent, based on the entire weight of said crosslinked polymeric composition, wherein said crosslinked polymeric composition has a limiting oxygen index of at least 20%.

10. A coated conductor, comprising:
(a) a conductive core; and
(b) at least a portion of said crosslinked polymeric composition of claim 8 surrounding at least a portion of said conductive core.

* * * * *